United States Patent
Lin et al.

(10) Patent No.: US 9,268,050 B2
(45) Date of Patent: Feb. 23, 2016

(54) DETERMINING A CONFIDENCE VALUE FOR A FRACTURE PLANE

(71) Applicant: Halliburton Energy Services, Inc., Houston, TX (US)

(72) Inventors: Avi Lin, Houston, TX (US); Jianfu Ma, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 13/896,394

(22) Filed: May 17, 2013

(65) Prior Publication Data

US 2014/0098632 A1   Apr. 10, 2014

Related U.S. Application Data

(60) Provisional application No. 61/710,582, filed on Oct. 5, 2012.

(51) Int. Cl.
*G01V 1/00* (2006.01)
*G01V 1/28* (2006.01)
(Continued)

(52) U.S. Cl.
CPC ............. *G01V 1/288* (2013.01); *G01V 1/301* (2013.01); *G01V 1/34* (2013.01); *G01V 1/345* (2013.01); *G01V 1/40* (2013.01); *G01V 2210/1234* (2013.01); *G01V 2210/646* (2013.01)

(58) Field of Classification Search
CPC ... G01V 2210/646; G01V 1/40; G01V 1/288; G01V 1/301
USPC .......................................................... 367/38
See application file for complete search history.

(56) References Cited

U.S. PATENT DOCUMENTS

| 5,497,722 A | 3/1996 | English, Sr. |
| 7,079,952 B2 * | 7/2006 | Thomas et al. ............ 702/13 |

(Continued)

FOREIGN PATENT DOCUMENTS

| WO | WO 2008/107859 | 9/2008 |
| WO | WO 2011/077227 | 6/2011 |

(Continued)

OTHER PUBLICATIONS

Authorized Officer Philip Bream, PCT International Preliminary Report on Patentability, PCT/US2013/056160, Jan. 20, 2015, 7 pages.

(Continued)

*Primary Examiner* — Mark Hellner
(74) *Attorney, Agent, or Firm* — Holly Soehnge; Fish & Richardson P.C.

(57) ABSTRACT

Systems, methods, and software can be used to determine a confidence value for a fracture plane. In some aspects, a subset of microseismic events associated with a fracture treatment of a subterranean zone are selected. Confidence in associating the selected subset of microseismic events with a common fracture plane is determined. The confidence can be determined, for example, based on the number of microseismic events in the subset, a location uncertainty for each microseismic event in the subset, a moment magnitude for each microseismic event in the subset, a distance between each microseismic event and a fracture plane fitted to the microseismic events, an orientation of the fracture plane fitted to the microseismic events, or a combination of these and other factors.

19 Claims, 6 Drawing Sheets

(51) Int. Cl.
*G01V 1/40* (2006.01)
*G01V 1/34* (2006.01)
*G01V 1/30* (2006.01)

(56) References Cited

U.S. PATENT DOCUMENTS

| | | |
|---|---|---|
| 7,103,219 B2 | 9/2006 | Cahill |
| 7,783,127 B1 | 8/2010 | Wilensky |
| 8,386,226 B2 | 2/2013 | Craig |
| 8,392,165 B2 | 3/2013 | Craig et al. |
| 2007/0272407 A1 | 11/2007 | Lehman et al. |
| 2008/0004847 A1 | 1/2008 | Bradford |
| 2010/0149913 A1 | 6/2010 | Savary-Sismondini et al. |
| 2010/0307755 A1 | 12/2010 | Xu et al. |
| 2010/0312529 A1 | 12/2010 | Souche et al. |
| 2011/0029291 A1 | 2/2011 | Weng et al. |
| 2011/0029293 A1 | 2/2011 | Petty et al. |
| 2011/0120702 A1 | 5/2011 | Craig |
| 2011/0120705 A1 | 5/2011 | Walters et al. |
| 2011/0120706 A1 | 5/2011 | Craig |
| 2011/0120718 A1 | 5/2011 | Craig |
| 2013/0144532 A1* | 6/2013 | Williams et al. ............... 702/11 |

FOREIGN PATENT DOCUMENTS

| | | |
|---|---|---|
| WO | WO 2012/078128 | 6/2012 |
| WO | WO 2012/141720 | 10/2012 |

OTHER PUBLICATIONS

Authorized Officer Philip Bream, International Search Report and Written Opinion of the International Searching Authority, PCT/US2013/056160, Dec. 18, 2013, 17 pages.

Ma et al., "Geometrical Presentation of Fracture Planes", Utility U.S. Appl. No. 13/896,400, filed May 17, 2013, 49 pages.

Williams et al., "Quantitative Interpretation of Major Planes from Microseismic Events Locations With Application in Production Prediction", SEG 2010-2085, 2010 SEG Annual Meeting, October, Denver, Colorado, 5 pages.

Mayerhofer et al., "Integrating Fracture Diagnostic Engineering Data in the Marcellus Shale," SPE 145463, 2011, SPE Annual Technical Conference and Exhibition, Oct. 30-Nov. 2, 2011, Denver, Colorado, 15 pages.

Verdon et al., "Imaging Fractures and Sedimentary Fabrics using Shear Wave Splitting Measurements made on Passive Seismic Data", Geophysical Journal International, vol. 179, No. 2, Nov. 1, 2009, pp. 1245-1254.

\* cited by examiner

DETERMINING A CONFIDENCE VALUE FOR A FRACTURE PLANE

CROSS-REFERENCE TO RELATED APPLICATIONS

This application claims priority to U.S. Provisional Application Ser. No. 61/710,582, entitled "Identifying Dominant Fracture Orientations," filed on Oct. 5, 2012.

BACKGROUND

This specification relates to determining a confidence value for a fracture plane identified from microseismic data. Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

SUMMARY

In some aspects, a confidence value is determined. The confidence value can represent, for example, a confidence in associating microseismic data points to a fracture plane.

In some aspects, a subset of microseismic events associated with a subterranean zone are selected, and confidence in associating the selected subset of microseismic events with a common fracture plane is determined.

Implementations may include one or more of the following features. The confidence can be determined, for example, based on the number of microseismic events in the subset, a location uncertainty for each microseismic event in the subset, a moment magnitude for each microseismic event in the subset, a distance between each microseismic event and a fracture plane fitted to the microseismic events, an orientation of the fracture plane fitted to the microseismic events, or a combination of these and other factors.

Additionally or alternatively, these and other implementations may include one or more of the following features. The confidence is determined by fitting a fracture plane to the locations of the microseismic events and calculating the confidence based on the fitted fracture plane. The confidence is determined based on an orientation of the fitted fracture plane with respect to a dominant orientation trend defined by a superset of microseismic events associated with the subterranean zone. The confidence is determined based on distances between the fitted fracture plane and each microseismic event in the subset. The confidence is determined by fitting a plurality of shifted fracture planes based on the locations and location uncertainties associated with the microseismic events. The confidence is then determined based on the shifted fracture planes. The confidence is determined by calculating a distance between the shifted fracture planes.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In some aspects of what is described here, fracture parameters, dominant fracture orientations, or other data are identified from microseismic data. In some instances, these or other types of data are dynamically identified, for example, in a real-time fashion during a fracture treatment. For many applications and analysis techniques, an identification of fracture planes from real-time microseismic events is needed, and individual fracture planes can be displayed to show time evolution and geometric elimination, including location, propagation, growth, reduction, or elimination of the fracture planes. Such capabilities can be incorporated into control systems, software, hardware, or other types of tools available to oil and gas field engineers when they analyze potential oil and gas fields, while stimulating hydraulic fractures and analyzing the resultant signals. Such tools can provide a reliable and direct interface for presenting and visualizing the dynamics of hydraulic fractures, which may assist in analyzing the fracture complexity, fracture network structure, and reservoir geometry. Such tools can assist in evaluating the effectiveness of hydraulic fracturing treatment, for example, by improving, enhancing, or optimizing the fracture density and trace lengths and heights. Such improvements in the fracture treatment applied to the reservoir may enhance production of hydrocarbons or other resources from the reservoir.

Hydraulic fracture treatments can be applied in any suitable subterranean zone. Hydraulic fracture treatments are often applied in tight formations with low-permeability reservoirs, which may include, for example, low-permeability conventional oil and gas reservoirs, continuous basin-centered resource plays and shale gas reservoirs, or other types of formations. Hydraulic fracturing can induce artificial fractures in the subsurface, which can enhance the hydrocarbon productivity of a reservoir.

During the application of a hydraulic fracture treatment, the injection of high-pressure fluids can alter stresses, accumulate shear stresses, and cause other effects within the geological subsurface structures. In some instances, microseismic events are associated with hydraulic fractures induced by the fracturing activities. The acoustic energy or sounds associated with rock stresses, deformations, and fracturing can be detected and collected by sensors. In some instances, microseismic events have low-energy (e.g., with the value of the log of the intensity or moment magnitude of less than three), and some uncertainty or accuracy or measurement error is associated with the event locations. The uncertainty can be described, for example, by a prolate spheroid, where the highest likelihood is at the spheroid center and the lowest likelihood is at the edge.

Microseismic event mapping can be used to geometrically locate the source point of the microseismic events based on the detected compressional and shear waves. The detected compressional and shear waves (e.g., p-waves and s-waves) can yield additional information about microseismic events, including the location of the source point, the event's location and position measurement uncertainty, the event's occurrence time, the event's moment magnitude, the direction of particle motion and energy emission spectrum, and possibly others. The microseismic events can be monitored in real time, and in some instances, the events are also processed in real time during the fracture treatment. In some instances, after the fracture treatment, the microseismic events collected from the treatment are processed together as "post data."

Processing microseismic event data collected from a fracture treatment can include fracture matching (also called fracture mapping). Fracture matching processes can identify fracture planes in any zone based on microseismic events collected from the zone. Some example computational algorithms for fracture matching utilize microseismic event data (e.g., an event's location, an event's location measurement uncertainty, an event's moment magnitude, etc.) to identify individual fractures that match the collected set of microseismic events. Some example computational algorithms can compute statistical properties of fracture patterns. The statistical properties may include, for example, fracture orientation, fracture orientation trends, fracture size (e.g., length, height, area, etc.), fracture density, fracture complexity, fracture network properties, etc. Some computational algorithms account for uncertainty in the events' location by using multiple realizations of the microseismic event locations. For example, alternative statistical realizations associated with Monte Carlo techniques can be used for a defined probability distribution on a spheroid or another type of distribution.

Generally, fracture matching algorithms can operate on real-time data, post data, or any suitable combination of these and other types of data. Some computational algorithms for fracture matching operate only on post data. Algorithms operating on post data can be used when any subset or several subsets of microseismic data to be processed has been collected from the fracture treatment; such algorithms can access (e.g., as an initial input) the full subset of microseismic events to be processed. In some implementations, fracture matching algorithms can operate on real-time data. Such algorithms may be used for real-time automatic fracture matching during the fracture treatment. Algorithms operating on real-time data can be used during the fracture treatment, and such algorithms can adapt or dynamically update a previously-identified fracture model to reflect newly-acquired microseismic events. For example, once a microseismic event is detected and collected from the treatment field, a real-time automatic fracture matching algorithm may respond to this new event by dynamically identifying and extracting fracture planes from the already-collected microseismic events in a real-time fashion. Some computational algorithms for fracture matching can operate on a combination of post data and real-time data.

In some cases, fracture mapping algorithms are configured to handle conditions that arise in real-time microseismic data processing. For example, several types of challenges or conditions may occur more predominantly in the real-time context. In some instances, real-time processing techniques can be adapted to account for (or to reduce or avoid) the lower accuracy that is sometimes associated with fractures extracted from data sets lacking a sufficient number of microseismic events or lacking a sufficient number of microseismic events in certain parts of the domain. Some real-time processing techniques can be adapted to produce fracture data that are consistent with the fracture data obtainable from post data processing techniques. For example, some of the example real-time processing techniques described here have produced results that are statistically the same, according to the statistical hypothesis test (t test and F test), as results produced by post data processing techniques on the same data.

In some cases, real-time processing techniques can be adapted to readily (e.g., instantaneously, from a user's perspective) offer the identified fracture data to users. Such features may allow field engineers or operators to dynamically obtain fracture geometric information and adjust fracture treatment parameters when appropriate (e.g. to improve, enhance, optimize, or otherwise change the treatment). In some instances, fracture planes are dynamically extracted from microseismic data and displayed to field engineers in real time. Real-time processing techniques can exhibit high-speed performance. In some cases, the performance can be enhanced by parallel computing technology, distributed computing technology, parallel threading approaches, fast binary-search algorithms, or a combination of these and other hardware and software solutions that facilitate the real-time operations.

In some implementations, fracture matching technology can directly present information about fractures planes associated with three-dimensional microseismic events. The fracture planes presented can represent fracture networks that exhibit multiple orientations and activate complex fracture patterns. In some cases, hydraulic fracture parameters are extracted from a cloud of microseismic event data; such parameters may include, for example, fracture orientation trends, fracture density, and fracture complexity. Confidence values can be determined for the extracted parameters or other information. The fracture parameter and confidence information can be presented to field engineers or operators, for example, in a tabular, numerical, or graphical interface or an interface that combines tabular, numerical, and graphical elements. The graphical interface can be presented in real time and can exhibit the real-time dynamics of hydraulic fractures. In some instances, this can help field engineers analyze the fracture complexity, the fracture network and reservoir geometry, or it can help them better understand the hydraulic fracturing process as it progresses.

In some implementations, accuracy confidence values are used to quantify the certainty of the fracture planes extracted from microseismic data. The accuracy confidence values can be used to classify the fractures into confidence levels. For example, three confidence levels (low confidence level, medium confidence level and high confidence level) are appropriate for some contexts, while in other contexts a different number (e.g., two, four, five, etc.) of confidence levels may be appropriate. A fracture plane's accuracy confidence value can be calculated based on any appropriate data. In some implementations, a fracture plane's accuracy confidence value is calculated based on the microseismic events' locations and position uncertainties, individual microseismic events' moment magnitudes, distances between individual events and their supporting fracture plane, the number of supporting events associated with the fracture plane, and the weight of variation of the fracture orientation, among others.

The accuracy confidence values can be computed and the fracture planes can be classified at any appropriate time. In some cases, the accuracy confidence values are computed and the fracture planes are classified in real time during the fracture treatment. The fracture planes can be presented to the user at any appropriate time and in any suitable format. In some instances, the fracture planes are presented graphically in a user interface in real time according to the accuracy confidence values, according to the accuracy confidence levels, or according to any other type of classification. In some instances, users can select individual groups or individual planes (e.g., those with high confidence levels) for viewing or analysis. The fracture planes can be presented to the user in an algebraic format, a numerical format, graphical format, or a combination of these and other formats.

Fracture accuracy confidence can be used a measure for the certainty associated with fracture planes identified from microseismic data. In some cases, the accuracy confidence is identified in real time during the fracture treatment. The accuracy confidence can be determined from any suitable data using any suitable calculations. In some cases, the accuracy confidence value for a fracture plane is influenced by the number of microseismic events associated with the fracture plane. For example, the accuracy confidence value can scale (e.g., linearly, non-linearly, exponentially, polynomially, etc.) with the number of microseismic events according to a function. The number of microseismic events associated with a fracture plane can be incorporated (e.g., as a weight, an exponent, etc.) in an equation for calculating the accuracy confidence. In some instances, a fracture plane has a higher confidence value when the fracture plane is supported by a larger number of microseismic data points (or a lower confidence value when the fracture plane is supported by a smaller number of microseismic data points).

In some cases, the accuracy confidence value for a fracture plane is influenced by the location uncertainty for the microseismic events associated with the fracture plane. For example, the accuracy confidence value can scale (e.g., linearly, non-linearly, exponentially, polynomially, etc.) with the microseismic event's location uncertainty according to a function. The microseismic event's location uncertainty can be incorporated (e.g., as a weight, an exponent, or any decaying function of the distance, etc.) in an equation for calculating the accuracy confidence. In some instances, a fracture plane has a higher confidence value when the fracture plane is supported by microseismic data points having lower uncertainty (or a lower confidence value when the fracture plane is supported by microseismic data points having higher uncertainty).

In some cases, the accuracy confidence value for a fracture plane is influenced by the moment magnitude for the microseismic events associated with the fracture plane. For example, the accuracy confidence value can scale (e.g., linearly, non-linearly, exponentially, polynomially, etc.) with the microseismic event's moment magnitude according to a function. The microseismic event's moment magnitude can be incorporated (e.g., as a weight, an exponent, etc.) in an equation for calculating the accuracy confidence. The moment magnitude for a microseismic event can refer to the energy or intensity (sometimes proportional to the square of the amplitude) of the event. For example, the moment magnitude for a microseismic event can be a logarithmic scale value of the energy or intensity, or another type of value representing energy intensity. In some instances, a fracture plane has a higher confidence value when the fracture plane is supported by microseismic data points having higher intensity (or a lower confidence value when the fracture plane is supported by microseismic data points having lower intensity).

In some cases, the accuracy confidence value for a fracture plane is influenced by the distance between the fracture plane and the microseismic events associated with the fracture plane. For example, the accuracy confidence value can scale (e.g., linearly, non-linearly, exponentially, polynomially, etc.) with the average distance between the fracture plane and the microseismic events supporting the fracture plane. The average distance can be incorporated (e.g., as a weight, an exponent, etc.) in an equation for calculating the accuracy confidence. In some instances, a fracture plane has a higher confidence value when the fracture plane is supported by microseismic data points that are, on average, closer to the fracture plane (or a lower confidence value when the fracture plane is supported by microseismic data points that are, on average, farther from the fracture plane).

In some cases, the accuracy confidence value for a fracture plane is influenced by the fracture plane's orientation with respect to a dominant orientation trend in the microseismic data set. For example, the accuracy confidence value can scale (e.g., linearly, non-linearly, exponentially, polynomially, etc.) with the angular difference between the fracture plane's orientation and a dominant orientation trend in the microseismic data. The orientation angles can include strike, dip or any relevant combination (e.g., a three-dimensional spatial angle). The orientation can be incorporated (e.g., as a weight, an exponent, etc.) in an equation for calculating the accuracy confidence. A microseismic data set can have one dominant orientation trend or it can have multiple dominant orientation trends. Dominant orientation trends can be classified, for example, as primary, secondary, etc. In some instances, a fracture plane has a higher confidence value when the fracture plane is aligned with a dominant orientation trend in the microseismic data set (or a lower confidence value when the fracture plane is deviated from the dominant orientation trend in the microseismic data set).

A weighting value called the "weight of variation of fracture orientation" can represent the angular difference between the fracture plane's orientation and a dominant orientation trend in the microseismic data. The weight of variation of fracture orientation can be a scalar value that is a maximum when the fracture plane is aligned with a dominant orientation trend. The weight of variation of fracture orientation can be a minimum for fracture orientations that are maximally separated from a dominant fracture orientation trend. For example, when there is a single dominant fracture orientation trend, the weight of variation of fracture orientation can be zero for fractures that are perpendicular (or normal) to the dominant fracture orientation. As another example, when there are multiple dominant fracture orientation trends, the weight of variation of fracture orientation can be zero for fractures having orientations between the dominant fracture orientations. The weight of variation of the fracture orientation can be the ratio of the calculated plane's orientation and the orientation reflected by the homogeneous case.

In some cases, when there are multiple dominant fracture orientation trends, the weight of variation of fracture orientation has the same maximum value for each dominant fracture orientation trend. In some cases, when there are multiple dominant fracture orientations, the weight of variation of fracture orientation has a different local maximum value for each dominant fracture orientation. For example, the weight of variation of fracture orientation can be 1.0 for fractures that are parallel to a first dominant fracture orientation trend, 0.8 for fractures that are parallel to a second dominant fracture orientation trend, and 0.7 for fractures that are parallel to a third dominant fracture orientation trend. The weight of variation of fracture orientation can decrease to local minima between the dominant fracture orientations trend. For example, the weight of variation of fracture orientation between each neighboring pair of dominant fracture orientations can define a local minimum halfway between the dominant fracture orientations or at another point between the dominant fracture orientations.

The accuracy confidence parameter can be influenced by the supporting microseismic events' location uncertainty, the supporting microseismic events' moment magnitude, distance between the supporting microseismic events and the fracture plane, the number of supporting events associated with the plane, the weight of variation of fracture orientation, other values, or any appropriate combination of one or more of these. In some general models, the confidence increases as moment magnitude is larger, and as the variation of the fraction orientation becomes larger, and the number of supporting events is larger, and their accuracy in their location is larger, and as the variation of the weight as a function of the distance is larger. These factors can be used as inputs for defining weight in an equation for the accuracy confidence. For example, in some models, the weights are linear or nonlinear functions of these factors and the weight of variation of the fracture orientation may appear with higher weight when influencing the plane's confidence. In some examples, the accuracy confidence is calculated as:

$$\text{Confidence} = (\text{weight of variation of fracture orientation}) * \sum_{i=1}^{number\ of\ events} ((\text{location uncertainty weight}) * (\text{moment magnitude weight}) * (\text{distance variation weight})). \quad (1)$$

Other equations or algorithms can be used to compute the confidence.

The identified fracture planes can be classified into confidence levels based on the fracture planes' accuracy confidence values. In some instances, three levels are used: low confidence level, medium confidence level and high confidence level. Any suitable number of confidence levels can be used. In some examples, when a new event is added to the supporting set associated with an existing fracture plane, its associated fracture confidence parameter may increase, which may cause the fracture plane to roll from its current confidence level to a higher one, if it exists. As another example, if a fracture's orientation diverts away from orientation trends exhibited by post microseismic event data, as microseismic events gradually accumulate, a decrease in fracture confidence may be induced, mainly by the weight of variation of fracture orientation, causing the plane to decrease its level to a lower confidence level, if it exists. This may particularly apply to fractures created at the initial time of hydraulic fracturing treatment; it may also apply to other types of fractures in other contexts.

Users (e.g., field engineers, operational engineers and analysts, and others) can be provided a graphical display of the fracture planes identified from the microseismic data. In some cases, the graphical display allows the user to visualize the identified planes in a real time fashion, in graphical panels presenting the confidence levels. For example, three graphical panels can be used to separately present the low confidence level, medium confidence level and high confidence level fracture planes. In some cases, the lower confidence level fracture planes are created in the initial times of the fracturing treatment. In some cases, higher confidence level fracture planes propagate in time in the direction nearly perpendicular to the wellbore. As new microseismic events gradually accumulate in time, the graphical display can be updated to enable users to dynamically observe the fracture planes association among confidence levels associated with the graphical panels.

The confidence level groups can be presented as plots of the fracture planes, or the confidence level groups can be presented in another format. The confidence level groups can be presented algebraically, for example, by showing the algebraic parameters (e.g., parameters for the equation of a plane) of the fracture planes in each group. The confidence level groups can be presented numerically, for example, by showing the numerical parameters (e.g., strike, dip, area, etc.) of the fracture planes in each group. The confidence level groups can be presented in a tabular form, for example, by presenting a table of the algebraic parameters or numerical parameters of the fracture planes in each group. Moreover, a fracture plane can be represented graphically in a three-dimensional space, a two-dimensional space, or another space. For example, a fracture plane can be represented in a rectilinear coordinate system (e.g., x, y, z coordinates) in a polar coordinate system (e.g., r, θ, φ coordinates), or another coordinate system. In some examples, a fracture plane can be represented as a line at the fracture plane's intersection with another plane (e.g., a line in the xy-plane, a line in the xz-plane, a line in the yz-plane, or a line in any arbitrary plane or surface).

In some instances, a graphical display allows users to track and visualize spatial and temporal evolution of specific fracture planes, including their generation, propagation and growth. For example, a user may observe stages of a specific fracture plane's spatial and temporal evolution such as, for example, initially identifying the fracture plane based on three microseismic events, a new event that changes the plane's orientation, a new event that causes the planes' area to grow (e.g., vertically, horizontally, or both), or other stages in the evolution of a fracture plane. The spatial and temporal evolution of fracture planes may present the travel paths of stimulated fluids and proppants injected into the rock matrix. Visualization of dynamics of fracture planes can help users better understand the hydraulic fracturing process, analyze the fracture complexity more accurately, evaluate the effectiveness of hydraulic fracture, or improve the well performance.

Although this application describes examples involving microseismic event data, the techniques and systems described in this application can be applied to other types of data. For example, the techniques and systems described here can be used to process data sets that include data elements that are unrelated to microseismic events, which may include other types of physical data associated with a subterranean zone. In some aspects, this application provides a framework for processing large volumes of data, and the framework can be adapted for various applications that are not specifically described here. For example, the techniques and systems described here can be used to analyze spatial coordinates, orientation data, or other types of information collected from any source. As an example, soil or rock samples can be collected (e.g., during drilling), and the concentration of a given compound (e.g., a certain "salt") as function of location can be identified. This may help geophysicists and operators evaluate the geo-layers in the ground.

Figure 1A:
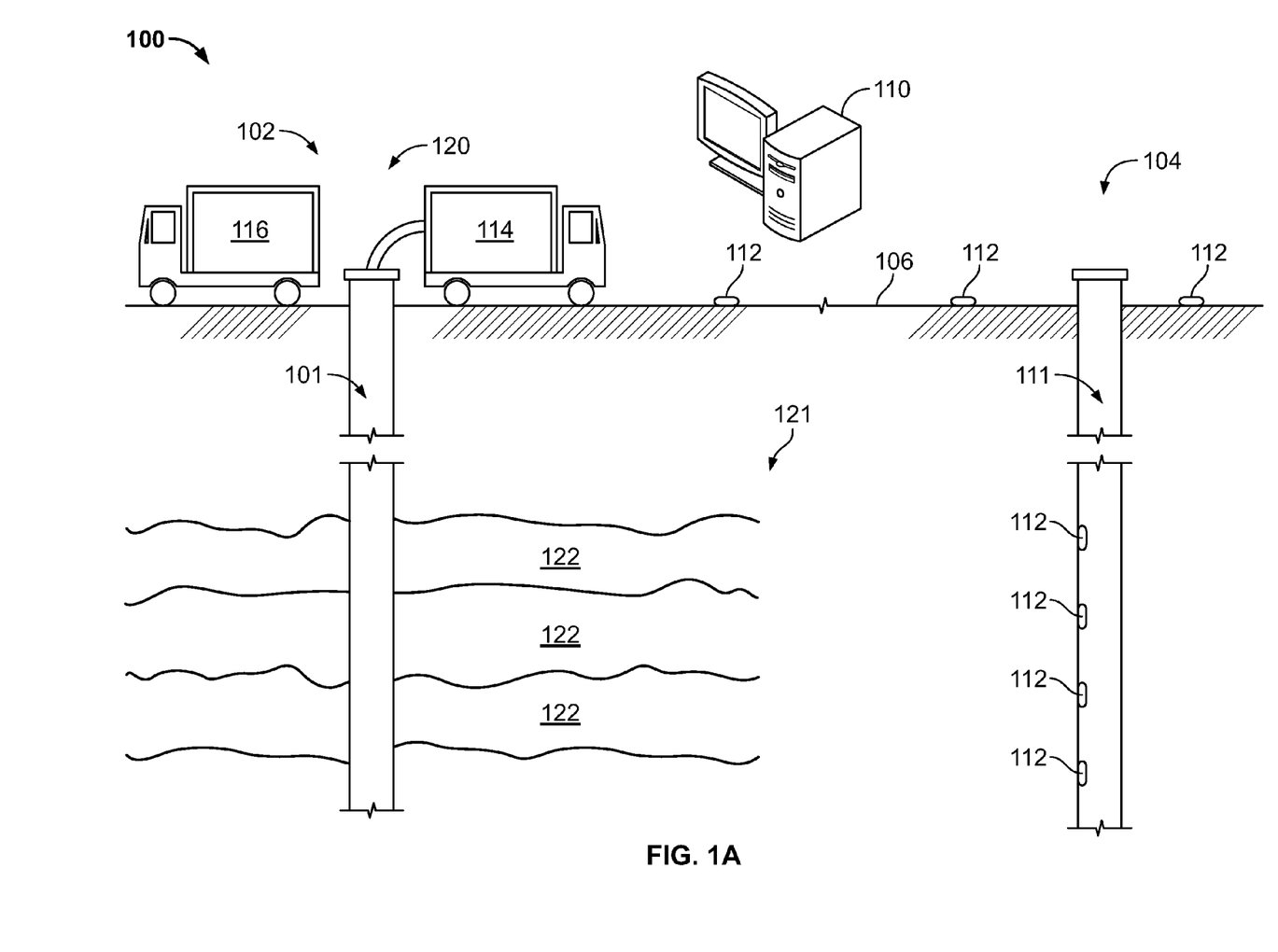
FIG. 1A is a diagram of an example well system.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at any suitable location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another suitable location. The well system 100 can include additional or different features, and the features of the well system can be arranged as shown in FIG. 1A or in any other suitable configuration.

The example treatment well 102 includes a well bore 101 in a subterranean zone 121 beneath the surface 106. The subterranean zone 121 can include one or less than one rock formation, or the subterranean zone 121 can include more than one rock formation. In the example shown in FIG. 1A, the subterranean zone 121 includes various subsurface layers 122. The subsurface layers 122 can be defined by geological or other properties of the subterranean zone 121. For example, each of the subsurface layers 122 can correspond to a particular lithology, a particular fluid content, a particular stress or pressure profile, or any other suitable characteristic. In some instances, one or more of the subsurface layers 122 can be a fluid reservoir that contains hydrocarbons or other types of fluids. The subterranean zone 121 may include any suitable rock formation. For example, one or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a follow-on fracture treatment, a re-fracture treatment, a final fracture treatment or another type of fracture treatment.

The fracture treatment can inject a treatment fluid into the subterranean zone 121 at any suitable fluid pressures and fluid flow rates. Fluids can be injected above, at or below a fracture initiation pressure, above at or below a fracture closure pressure, or at any suitable combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

A fracture treatment can be applied by any appropriate system, using any suitable technique. The pump trucks 114 may include mobile vehicles, immobile installations, skids, hoses, tubes, fluid tanks or reservoirs, pumps, valves, or other suitable structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single well bore, multiple fluid injection locations in multiple different well bores, or any suitable combination. Moreover, the fracture treatment can inject fluid through any suitable type of well bore, such as, for example, vertical well bores, slant well bores, horizontal well bores, curved well bores, or any suitable combination of these and others.

A fracture treatment can be controlled by any appropriate system, using any suitable technique. The instrument trucks 116 can include mobile vehicles, immobile installations, or other suitable structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some instances, the locations of individual microseismic events can be determined based on the microseismic data.

Microseismic events in the subterranean zone 121 may occur, for example, along or near induced hydraulic fractures. The microseismic events may be associated with pre-existing natural fractures or hydraulic fracture planes induced by fracturing activities. In some environments, the majority of detectable microseismic events are associated with shear-slip rock fracturing. Such events may or may not correspond to induced tensile hydraulic fractures that have significant width generation. The orientation of a fracture can be influenced by the stress regime, the presence of fracture systems that were generated at various times in the past (e.g., under the same or a different stress orientation). In some environments, older fractures can be cemented shut over geologic time, and remain as planes of weakness in the rocks in the subsurface.

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, without use of an observation well.

In some cases, all or part of the computing subsystem 110 can be contained in a technical command center at the well site, in a real-time operations center at a remote location, in another appropriate location, or any suitable combination of these. The well system 100 and the computing subsystem 110 can include or access any suitable communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or any suitable combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at any suitable time. In some instances, the computing subsystem 110 receives the microseismic data in real time (or substantially in real time) during the fracture treatment. For example, the microseismic data may be sent to the computing subsystem 110 immediately upon detection by the sensors 112. In some instances, the computing subsystem 110 receives some or all of the microseismic data after the fracture treatment has been completed. The computing subsystem 110 can receive the microseismic data in any suitable format. For example, the computing subsystem 110 can receive the microseismic data in a format produced by microseismic sensors or detectors, or the computing subsystem 110 can receive the microseismic data after the microseismic data has been formatted, packaged, or otherwise processed. The computing subsystem 110 can receive the microseismic data by any suitable means. For example, the computing subsystem 110 can receive the microseismic data by a wired or wireless communication link, by a wired or wireless network, or by one or more disks or other tangible media.

The computing subsystem 110 can be used to determine a confidence in associating microseismic events to a common fracture plane. For example, the computing subsystem 110 can determine an accuracy confidence value based on the microseismic events themselves, the parameters of the fracture plane, the relationship between the microseismic events and the fracture plane, or a combination of these and other factors. In some instances, the computing system 110 determines a confidence value according to the example technique shown in FIG. 4, or another technique can be used. The confidence can be used, for example, as a measure of certainty in associating the microseismic events to the fracture plane. In some instances, the confidence is used to categorize the fracture plane, for example, in a confidence level group. In some instances, the confidence is used to determine whether to store the fracture plane (e.g. when confidence is high) or discard the fracture plane (e.g. when confidence is below a specified threshold). For example, in some cases where the confidence for a fracture plane is below a specified threshold, some or all of the microseismic events can be regrouped to identify one or more new fracture planes with higher confidence.

Figure 1B:
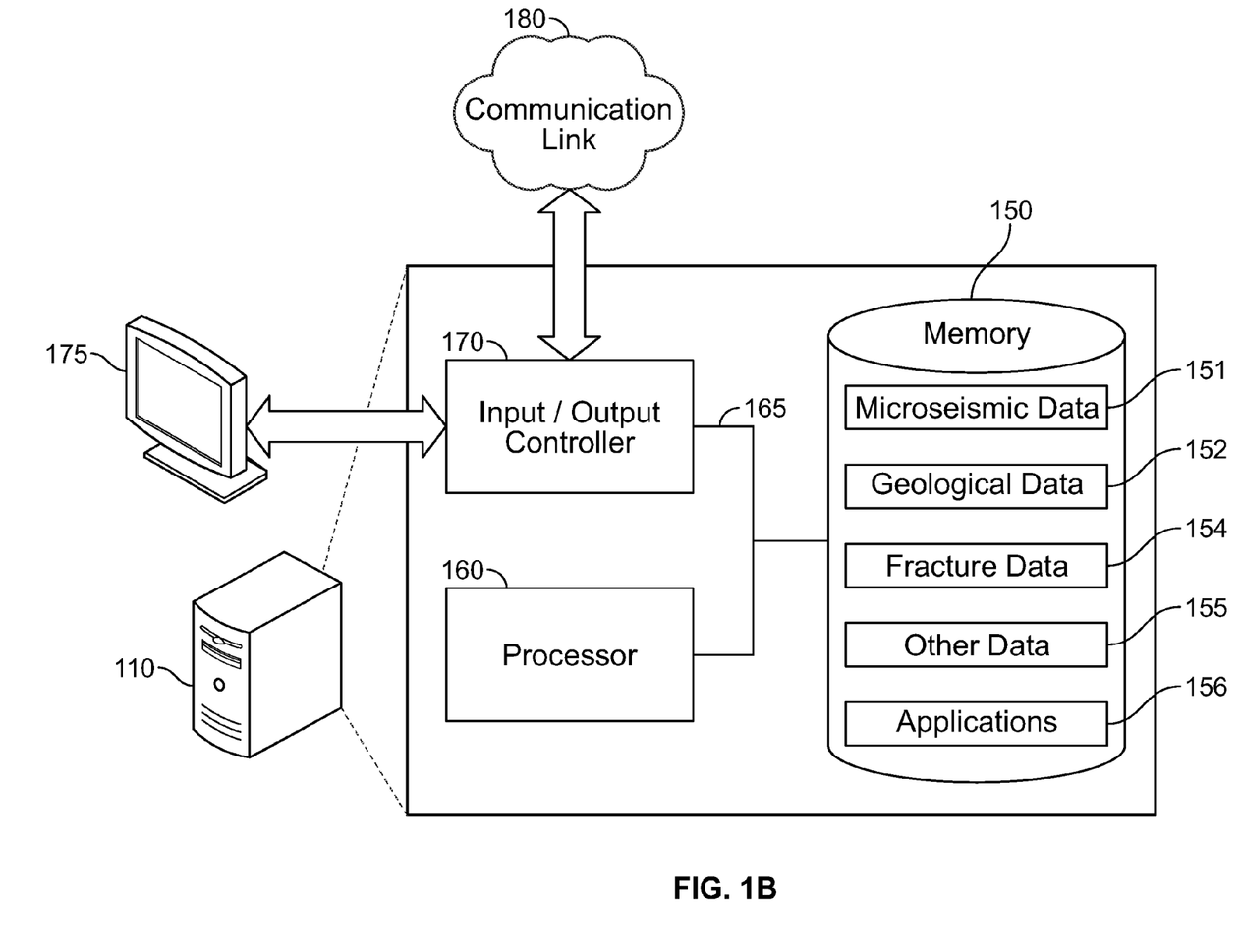
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include any suitable information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, microseismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or any other suitable information.

The applications 156 can include software applications, scripts, programs, functions, executables, or other modules that are interpreted or executed by the processor 160. Such applications may include machine-readable instructions for performing one or more of the operations represented in FIG. 4. The applications 156 may include machine-readable instructions for generating a user interface or a plot, such as, for example, those represented in FIG. 2A, 2B, 2C, or 3. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or generate one or more of the interfaces or plots shown in FIG. 2A, 2B, 2C, or 3. The input data received by the processor 160 or the output data generated by the processor 160 can include any of the microseismic data 151, the geological data 152, the fracture data 153, or the other data 155.

Figure 2A:
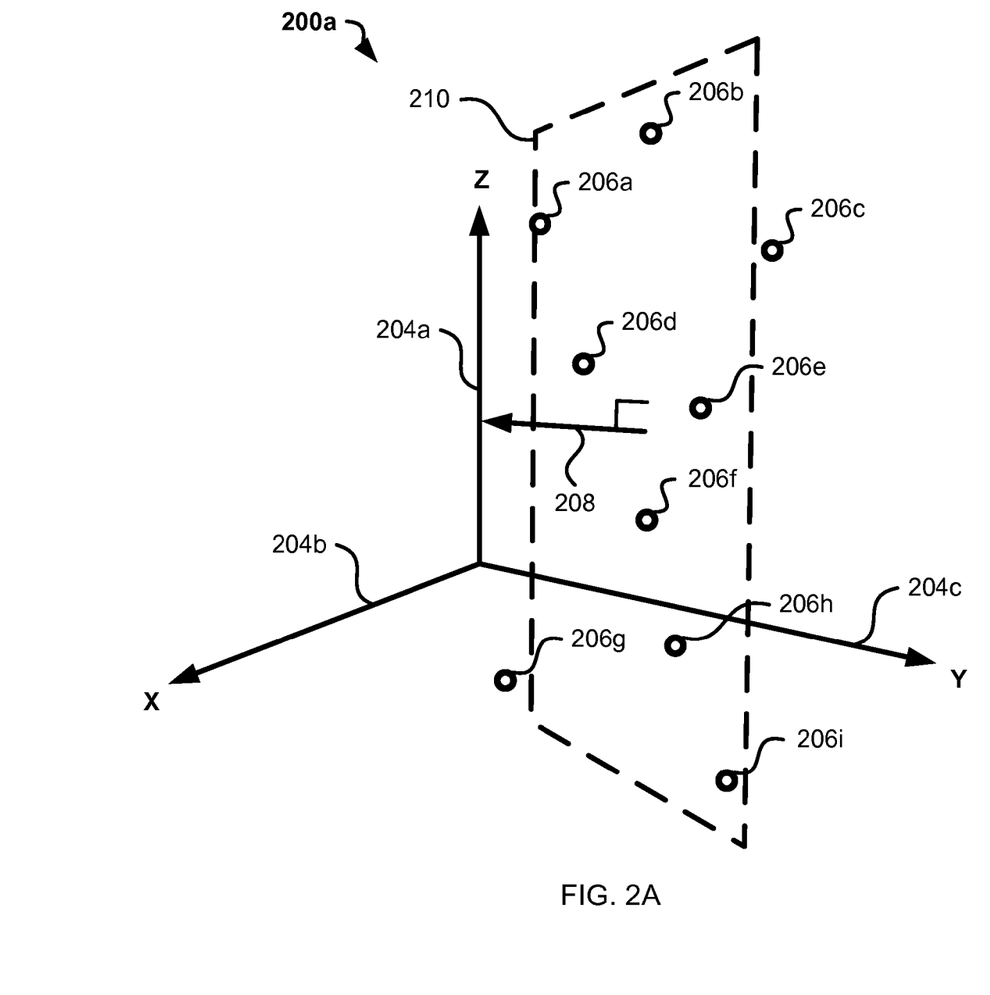
FIGS. 2A, 2B, and 2C are plots showing an example fracture plane identified from microseismic data.
Figure 2B:
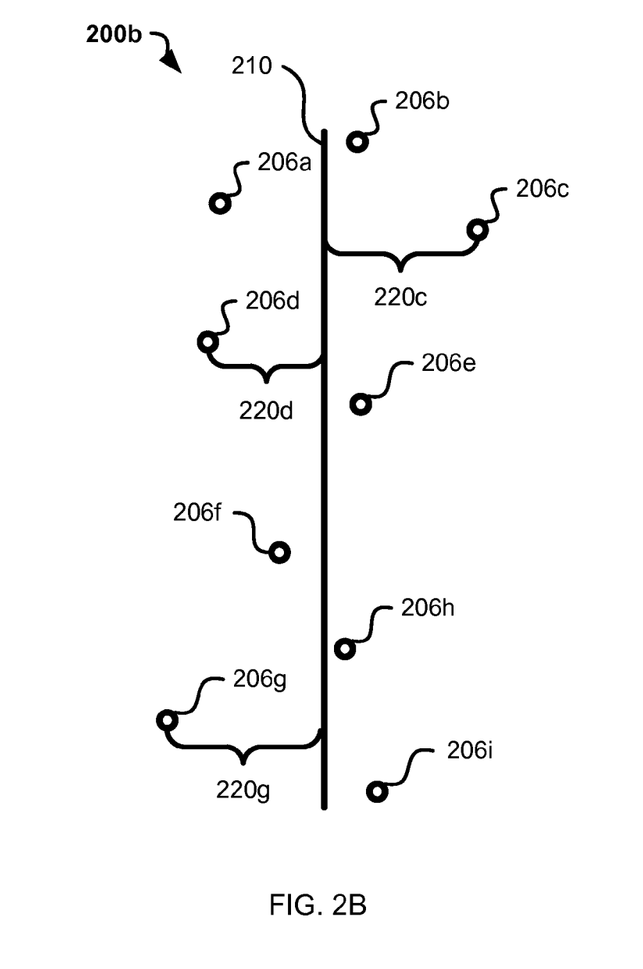
Figure 2C:
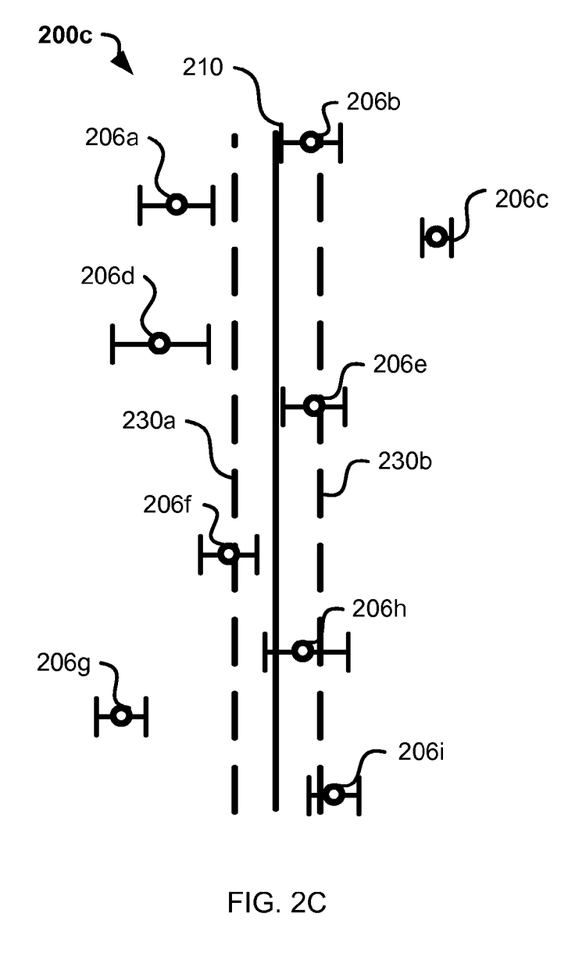

FIGS. 2A, 2B, and 2C are plots showing an example fracture plane 210 identified from microseismic data. FIG. 2A is a plot 200a showing a perspective view of the fracture plane 210 and nine microseismic events 206a, 206b, 206c, 206d, 206e, 206f, 206g, 206h, and 206i. FIG. 2B is a plot 200b showing a side view of the fracture plane 210 and the same nine microseismic events 206a, 206b, 206c, 206d, 206e, 206f, 206g, 206h, and 206i. FIG. 2C is a plot 200c showing a side view of the fracture plane 210 and two shifted planes 230a, 230b identified from location uncertainties associated with the nine microseismic events 206a, 206b, 206c, 206d, 206e, 206f, 206g, 206h, and 206i. Nine microseismic events are shown in the figures; a fracture plane can be computed from a different number of events (e.g., hundreds of events, thousands of events, etc.).

As shown in FIG. 2A, the example fracture plane 210 is a rectangular, two-dimensional area extending through three-dimensional space. A fracture plane can have another shape (e.g., triangular, ellipsoidal, polygonal, irregular, etc.). In some cases, a fracture plane can be a three-dimensional volume, for example, to represent the width, aperture, or other features of a fracture.

The plot 200a shows a rectilinear coordinate system; other types of coordinate systems (e.g., spherical, elliptical, etc.) can be used. In FIG. 2A, the vertical axis 204a represents the z-coordinate, the horizontal axis 204b represents the x-coordinate, and the horizontal axis 204c represents the y-coordinate. The normal vector 208 indicates the orientation of the fracture plane 210. A normal vector can be a unit vector (a vector having unit length) or a normal vector can have non-unit length.

The parameters of the fracture plane can be defined in any suitable coordinate system. For example, a fracture plane can be described by the parameters a, b, c, and d of the equation 0=ax+by+cz+d that defines a plane in the xyz-coordinate system. In some examples, the normal vector 208 has vector components (a, b, c). The vector components (a, b, c) can be computed, for example, based on the positions of the microseismic events, based on the parameters of the fracture plane 210, or based on other information. The orientation of the fracture plane 210 can be computed from the normal vector 208, the microseismic events themselves, parameters of the fracture plane 210, other data, or any combination of these. For example, the dip θ and the strike φ of the fracture plane 210 can be computed from the normal vector 208 based on the equations $$\theta = \arctan\frac{\sqrt{a^2+b^2}}{c}, \varphi = \arctan\frac{b}{a}. \quad (2)$$

The dip angle θ of a fracture plane can represent the angle between the fracture plane and the horizontal plane (e.g., the xy-plane). The strike angle φ of a fracture plane can represent the angle between a horizontal reference axis (e.g., the x-axis) and a horizontal line where the fracture plane intersects the horizontal plane. For example, the strike angle can be defined with respect to North or another horizontal reference direction. A fracture plane can be defined by other parameters, including angular parameters other than the strike angle and dip angle.

In some instances, the boundaries of the fracture plane can be defined by the fracture plane parameters, by the microseismic events, or other information. For example, a boundary of the fracture plane can be defined by a polygon connecting the outermost microseismic events projected onto the fracture plane. In some cases, boundaries of the fracture plane are not defined. For example, the fracture plane may be considered as having infinite extent. In some implementations, a fracture plane can be defined by orientation parameters. For example, a fracture plane can be defined by the strike angle and the dip angle.

As shown in FIG. 2B, the location of each microseismic event is a specified distance from the fracture plane 210. For example, the microseismic event 206c is a distance 220c from the fracture plane 210, the microseismic event 206d is a distance 220d from the fracture plane 210, the microseismic event 206g is a distance 220g from the fracture plane 210, etc. In some cases, one or more microseismic events lies on the fracture plane.

The location of a microseismic event can be defined by spatial coordinates. The coordinates can be included, for example, in microseismic data from a fracture treatment. In some instances, the coordinates are derived from microseismic signals detected from a subterranean zone. In some examples, the location of the $i^{th}$ microseismic event can be represented by the coordinates $(x_i, y_i, z_i)$, where $x_i$ represents the x coordinate of the $i^{th}$ microseismic event, $y_i$ represents the y coordinate of the $i^{th}$ microseismic event, $z_i$ represents the z coordinate of the $i^{th}$ microseismic event. For a fracture plane defined in an xyz-coordinate system by parameters a, b, c, and d, the distance between the $i^{th}$ microseismic event and the fracture plane can be represented as $$h_i = \frac{ax_i + by_i + cz_i + d}{\sqrt{a^2+b^2+c^2}}. \quad (3)$$

As shown in FIG. 2C, each microseismic event can have an associated location uncertainty. The location uncertainty represents the uncertainty associated with the measured location of the microseismic event. Uncertainty can arise, for example, due to measurement error, measurement precision, data processing, or other sources of uncertainty. The location uncertainty can specify a volume in which the microseismic event is most likely to have occurred. In FIG. 2C, the error bars represent the horizontal location uncertainty for the respective microseismic event. Generally, a microseismic event can have a location uncertainty in each spatial dimension. The location uncertainty can be represented, for example, as a volume (e.g., a spheroid, ellipsoid, etc.) centered on the measured coordinates of the microseismic event.

The location uncertainty for the microseismic events can be used to determine a confidence value for the fracture plane 210. For example, the location uncertainty for each microseismic event can be included as a weighting factor in computing a confidence value. In some cases, when a fracture plane is supported by microseismic events with higher location uncertainties, the fracture plane is given a lower confidence value.

In some implementations, the confidence value for a fracture plane is determined by computing multiple fracture planes from the supporting microseismic events. For example, FIG. 2C shows two shifted fracture planes 230a, 230b derived from the microseismic events 206a, 206b, 206c, 206d, 206e, 206f, 206g, 206h, and 206i. Each shifted fracture plane can be computed by shifting each microseismic event according to its location uncertainty in a direction perpendicular to the fracture plane 210. For example, the shifted fracture plane 230a (on the left in the figure) represents a plane computed from the leftmost point in the location uncertainty for each microseismic event in the figure; similarly, the shifted fracture plane 230b (on the right in the figure) represents a plane computed from the rightmost point in the location uncertainty for each microseismic event in the figure.

The confidence for the fracture plane 210 can be computed based on the distance between the shifted fracture planes 230a, 230b. For example, the confidence can scale (e.g., linearly, non-linearly, exponentially, polynomially, etc.) with the distance between the shifted fracture planes 230a, 230b. The distance between the shifted fracture planes can be incorporated (e.g., as a weight, an exponent, etc.) in an equation for calculating the confidence. In some instances, a fracture plane has a higher confidence value when the shifted fracture planes are closer together (or a lower confidence value when the shifted fracture planes are farther apart). The distance between the shifted fracture planes can be combined with other factors for determining a confidence value for the fracture plane 210.

Figure 3:
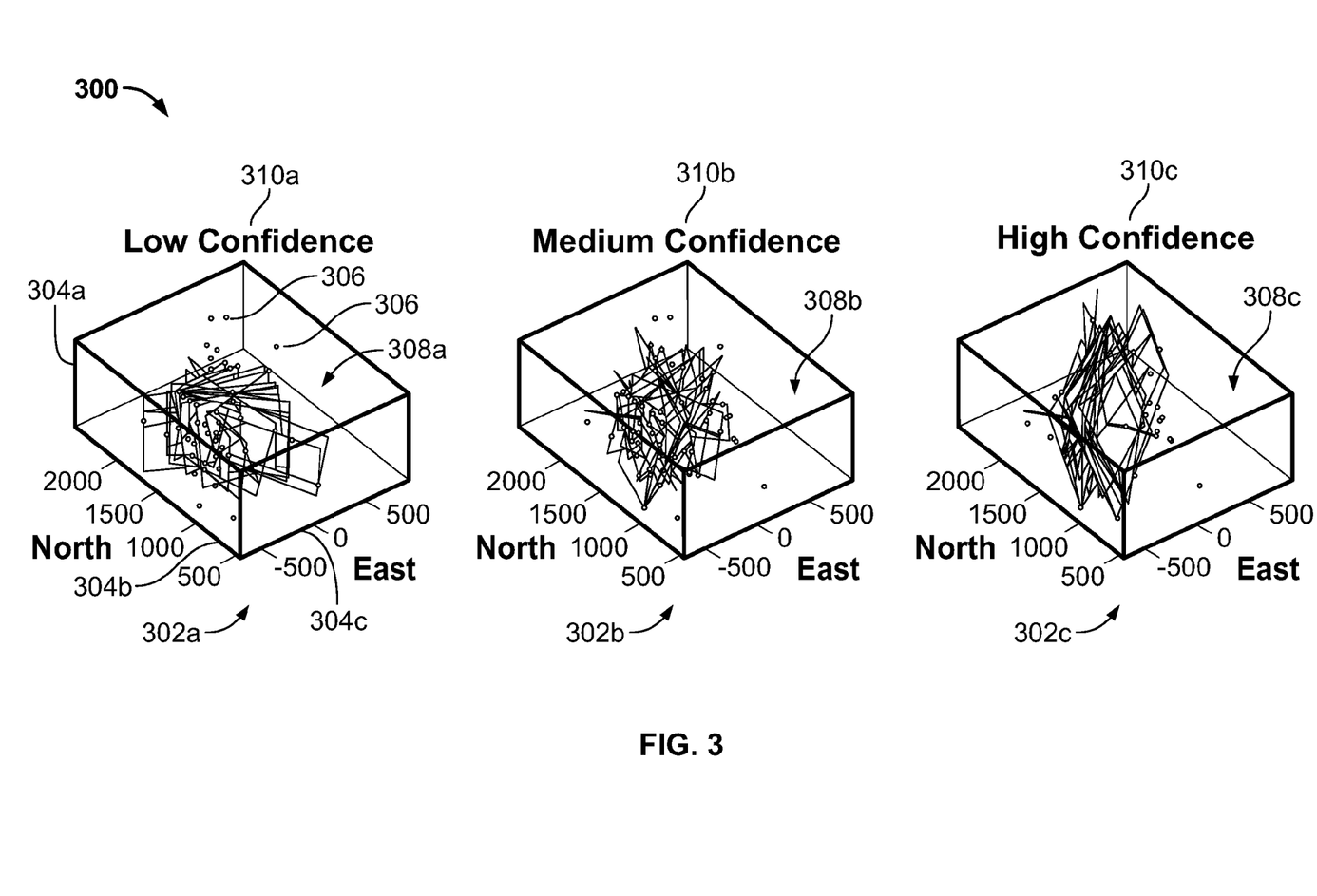
FIG. 3 is a diagram shown an example of a graphical presentation of fracture planes.

FIG. 3 is a diagram shown an example of a graphical presentation of fracture planes. In the example shown in FIG. 3, the graphical representation 300 of fracture planes includes three plots 302a, 302b, and 302c. The plots 302a, 302b, and 302c each include a respective label 310a, 310b, and 310c that indicates the confidence level associated with the fracture planes in the plot. The first plot 302a includes a group of fracture planes 308a associated with a low confidence level, as indicated by the label 310a. The second plot 302b includes a group of fracture planes 308b associated with a medium confidence level, as indicated by the label 310b. The third plot 302c includes a group of fracture planes 308c associated with a high confidence level, as indicated by the label 310c. Each of the plots also includes a graphical representation of microseismic data points, such as, for example, the microseismic data points 306 labeled in the first plot 302a.

The graphical representation 300 is an example of a graphical interface that can be presented to a user (field engineers, operational engineers and analysts, or other types of users) to enable the user to analyze microseismic data from a fracture treatment. For example, the graphical interface can be presented in real time to allow the user to view the fracture planes according to the confidence level groups. Different colors (or other visual indicia) can be used for the fracture planes in each plot. For example, the fracture planes in the low confidence level group can be red, the fracture planes in the medium confidence level group can be cyan, and the fracture planes in the high confidence level group can be blue. Other suitable colors, patterns, or visual indicia can be used. The example in FIG. 3 shows all of the fracture planes computed after the $180^{th}$ microseismic event. The first group of fracture planes 308a includes 45 planes, the second group of fracture planes 308b includes 39 planes, the third group of fracture planes 308c includes 42 planes.

One or all of the plots can be updated in response to receiving additional data. For example, after the $181^{st}$ microseismic event is received, one or more of the fracture planes can be updated based on the new microseismic data. The graphical representation 300 can be refreshed to show the updated fracture planes. In some instances, updating a fracture plane affects the fracture plane's accuracy confidence value, which may cause the fracture plane to be associated with a different confidence level group. In such cases, the graphical representation 300 can be refreshed to show the updated confidence level groups.

Each of the plots 302a, 302b, and 302c includes the respective group of fracture planes in a three-dimensional rectilinear coordinate system represented by the vertical axis 304a and two horizontal axes 304b and 304c. The vertical axis 304a represents a range of depths in a subterranean zone; the horizontal axis 304b represents a range of East-West coordinates; and the horizontal axis 304c represents a range of North-South coordinates (all in units of feet). In the example graphical representation 300 shown in FIG. 3, all of the fracture planes are represented by two-dimensional, rectangular areas extending in the three-dimensional coordinate system. Fracture planes can have other spatial geometries.

The three groups of fracture planes 308a, 308b, and 308c in FIG. 3 are disjoint sets; each of the plots 302a, 302b, and 302c includes a different set of fracture planes. In other words, in the example shown in FIG. 3, each fracture plane belongs to exactly one confidence level group. The groups of fracture planes 308a, 308b, and 308c are identified based on accuracy confidence values calculated for each plane. The first group of fracture planes 308a is a low confidence level group, and the fracture planes in the first group are associated with a low range of accuracy confidence values. The second group of fracture planes 308b is a medium confidence level group, and the fracture planes in the second group are associated with an intermediate range of accuracy confidence values. The third group of fracture planes 308c is a high confidence level group, and the fracture planes in the third group are associated with a high range of accuracy confidence values.

The accuracy confidence values can be calculated or assigned to the fracture planes by any suitable technique, based on any suitable information. For example, the accuracy confidence value for a fracture plane can be computed based on the supporting microseismic events' location uncertainty, the supporting microseismic events' moment magnitude, the distance between the supporting microseismic events and the fracture plane, the number of supporting events associated with the plane, the weight of variation of fracture orientation, other values, or any appropriate combination of one or more of these. The accuracy confidence value can be computed according to Equation 3 above or according to another equation or a different type of model, scheme, or algorithm.

In some examples, a respective range is defined for each confidence level group. Each range can be defined by one or more threshold values. For example, the low confidence level group can include all fracture planes having an accuracy confidence value below a first threshold value (e.g., 0.3), the high confidence level group can include all fracture planes having an accuracy confidence value above a second threshold value (e.g., 0.8), and the medium confidence level group can include all fracture planes having an accuracy confidence value between the two threshold values (e.g., between 0.3 and 0.8). Other values can be used for the thresholds. Moreover, more thresholds can be used. For example, the low confidence level group can have a lower cutoff threshold, so that fracture planes below a certain accuracy confidence value are not displayed. In some cases, the respective ranges for the confidence levels are set dynamically, for example, based on the quality of the data set of the microseismic events, such as uncertainty, moment magnitude, computed accuracy confidence values, based on the size of the microseismic data set, or other information. Although FIG. 3 shows three confidence level groups, another number (e.g., 4, 5, 6, 7, 8, etc.) of confidence level groups can be used. In some cases, optimal threshold values can be selected to show the sharpest separation in the presentation of the confidence level groups. The optimal threshold values can be used as defaults, or a user can override the default values with different thresholds.

By separating the groups of fracture planes 308a, 308b and 308c into distinct plots in the graphical representation 300, a user can readily distinguish the fracture planes associated with each respective confidence level. In the example shown in FIG. 3, each distinct plot has its own set of coordinate axes. In some cases, multiple distinct plots can be represented in a common set of coordinate axes. For example, the groups of fracture planes 308a, 308b and 308c can be shifted from each other in a common coordinate system. In some contexts, plots can be considered distinct when they are presented in non-overlapping regions of a graphical rendering. In some contexts, plots can be considered distinct when they are presented with graphical indicia that visually distinguish the plots within an overall graphical presentation.

In the example data shown in FIG. 3, the low confidence fracture planes correspond to fracture planes generated early in the fracture treatment, while the high confidence fracture planes propagate in time in the direction nearly perpendicular to the wellbore. The graphical representation 300 (or individual plots in the graphical representation 300) can be updated as new microseismic events gradually accumulate in time. For example, updating the plots can allow a user to dynamically observe the fracture planes association among the three panels, to track and visualize spatial and temporal evolution of specific fracture planes, and to monitor their generation, propagation and growth.

Figure 4:
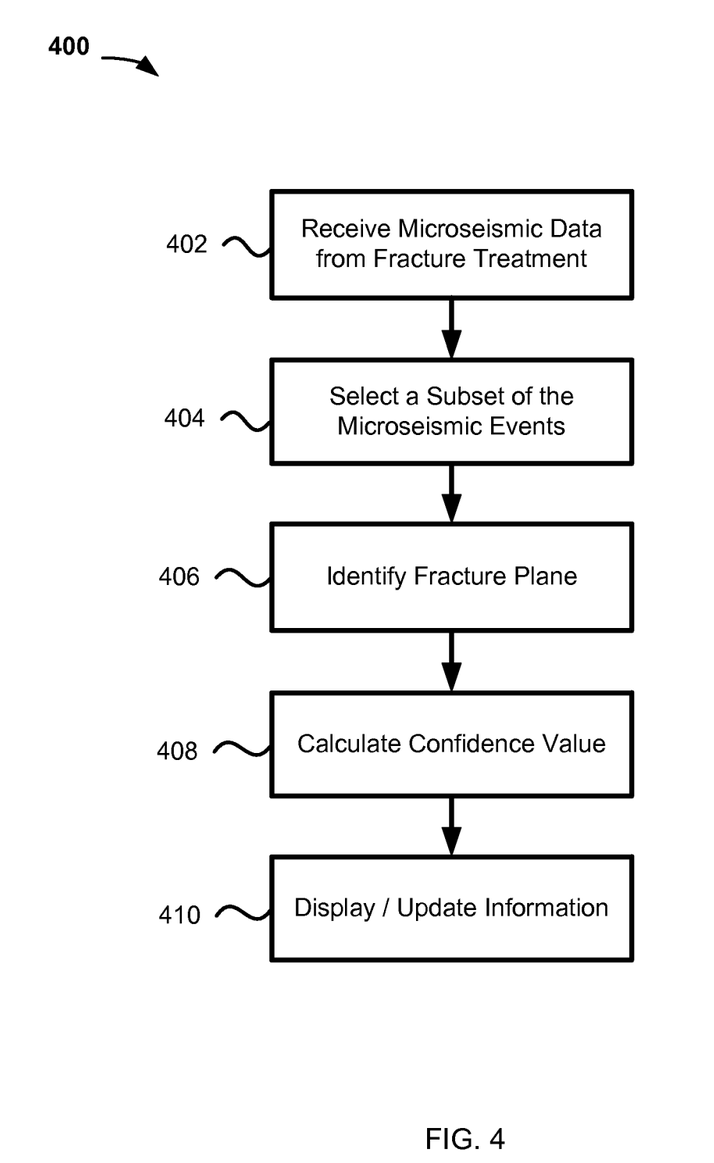
FIG. 4 is a flow chart of an example technique for computing a confidence value for a fracture plane.

FIG. 4 is a flow chart of an example process 400 for analyzing microseismic data. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some instances, the output is made available to a user within a time frame that allows an operator to respond to the output, for example, by modifying the fracture treatment.

In some cases, some or all of the operations in the process 400 are executed dynamically during a fracture treatment. An operation can be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some instances, microseismic monitoring begins before the fracture treatment is applied, ends after the fracture treatment is applied, or both.

At 404, a subset of the microseismic events are selected. In some instances, the subset is selected from a superset of microseismic events based on a trend in the data. For example, the subset of events may exhibit planar trend or another type of trend. In some cases, the subset is selected by selecting some or all of the microseismic events associated with a previously-generated fracture plane. For example, the subset can include one or more new microseismic events combined with microseismic events associated with a previously-generated fracture plane.

In some implementations, the subset of microseismic events are selected based on histogram data. For example, the subset may be selected based on a histogram of basic plane orientations defined by the microseismic event locations. Example techniques for generating, updating, and using histograms based on microseismic data are described in U.S. Provisional Application Ser. No. 61/710,582, filed on Oct. 5, 2012.

At 406, a fracture plane is identified from the selected subset of microseismic data. Any suitable technique can be used to identify a fracture plane from a set of microseismic events. In some cases, a Chi-square fitting technique is used. Given K observed microseismic events, the locations can be represented ($x_i$, $y_i$, $z_i$), and their measurement uncertainties can be represented ($\sigma_{i,x}$, $\sigma_{i,y}$, $\sigma_{i,z}$), where $1 \leq i \leq K$. The parameters of the plane model $z = ax + by + c$ can be calculated, for example, by minimizing the Chi-square merit function $$\chi^2(a, b, c) = \sum\nolimits_{i=1}^{K} \frac{(z_i - ax_i - by_i - c)^2}{\sigma_{i,z}^2 + a^2\sigma_{i,x}^2 + b^2\sigma_{i,y}^2} \qquad (4)$$

The Chi-square merit function can be solved by any suitable technique. In some instances, a solution can be obtained by solving three equations, which are the partial derivatives of $\chi^2$ (a, b, c) with respect to its variables, where each partial derivative is forced to zero. In some instances, there is no analytical solution for this nonlinear mathematical system of equations. Numerical methods (e.g., Newton's numerical method, the Newton Rafson method, the conjugate gradient method, or another technique) can be applied to solve for the parameters a, b and c, and the strike and dip angles can be computed (e.g., using equation (2) above).

In some implementations, the fracture plane is identified by using a weighted least squared distance technique to calculate fracture plane parameters. For example, a fracture plane parameter can be calculated based on a sum of weighted terms, where each of the weighted terms includes a weighting factor that decreases (e.g., linearly, nonlinearly, etc.) with a distance between at least one of the microseismic events and a fracture plane defined by the fracture plane parameters. In some cases, the parameters a, b, c, or d for the fracture plane $0=ax+by+cz+d$ are computed by selecting initial values of the fracture plane parameters a, b, c, and d and constructing a system of equations $\{\partial S/\partial a=0, \partial S/\partial b=0, \partial S/\partial c=0, \partial S/\partial d=0\}$, where S represents the weighted sum. Example techniques for identifying fracture planes from microseismic data are described in U.S. Provisional Application Ser. No. 61/710,582, filed on Oct. 5, 2012.

At 408, a confidence value is calculated. The confidence value can be computed based on the parameters of the fracture plane itself, parameters of the microseismic events that support the fracture plane, or other information. In some cases, an accuracy confidence value can be computed for a fracture plane based on the supporting microseismic events' location uncertainty, the supporting microseismic events' moment magnitude, the distance between the supporting microseismic events and the fracture plane, the number of supporting events associated with the plane, the weight of variation of fracture orientation, other values, or any appropriate combination of one or more of these. The accuracy confidence value can be computed according to Equation 3 above or according to another equation or a different type of algorithm.

At 410, the confidence information is displayed, updated, or both. For example, a graphical representation of the fracture plane can be presented along with the confidence information. In some cases, the fracture plane is assigned to a confidence level group with one or more other fracture planes, and the confidence level group is displayed together. For example, a fracture plane can be associated with a "high," "low," or "medium" confidence level group according to the confidence value calculated at 408. Example techniques for presenting fracture planes are described in U.S. Provisional Application Ser. No. 61/710,582, filed on Oct. 5, 2012.

In some cases, the confidence value is updated, for example, in response to receiving additional microseismic events, in response to removing microseismic events from the subset, or in other circumstances. Displaying (and in some cases, updating) the information can allow a user to view dynamic behavior associated with a fracture treatment. In some cases, a fracture plane and the associated confidence value are updated as additional microseismic data are accumulated. For example, a fracture plane can be updated as additional microseismic data is accumulated, and the updates may cause the accuracy confidence value for the fracture plane to increase or decrease. As such, in some instances a fracture plane can dynamically move from one confidence level group to another.

The fracture planes can be presented geometrically. A geometrical presentation of a fracture plane can be a graphical presentation, a numerical presentation, an algebraic presentation, or another type of presentation. In some cases, a fracture plane is presented (e.g., graphically, numerically, algebraically, etc.) on its own. The fracture plane can be presented with other information. In some cases, a fracture plane is presented (e.g., graphically, numerically, algebraically, etc.) along with a confidence value for the plane or a confidence level value for the plane. In some cases, a fracture plane is presented (e.g., graphically, numerically, algebraically, etc.) along with the microseismic data points that support the fracture plane. These examples and other information can be presented in any appropriate combination.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

In some aspects, some or all of the features described here can be combined or implemented separately in one or more software programs for real-time automated fracture mapping. The software can be implemented as a computer program product, an installed application, a client-server application, an Internet application, or any other suitable type of software. In some cases, a real-time automated fracture mapping program can dynamically show users spatial and temporal evolution of identified fracture planes in real-time as microseismic events gradually accumulate. The dynamics may include, for example, the generation of new fractures, the propagation and growth of existing fractures, or other dynamics. In some cases, a real-time automated fracture mapping program can provide users the ability to view the real-time identified fracture planes in multiple confidence levels. In some instances, users may observe spatial and temporal evolution of the high confidence level fractures, which may exhibit the dominant trends of overall microseismic event data. In some cases, a real-time automated fracture mapping program can evaluate fracture accuracy confidence, for example, to measure the certainty of identified fracture planes. The accuracy confidence values may, for example, help users better understand and analyze changes in a probability histogram or orientation distribution, which may continuously vary with the real-time accumulation of microseismic events. In some cases, a real-time automated fracture mapping program can provide results that are consistent with post data fracture mapping. For example, at the end of the hydraulic fracture treatment, the results produced by the real-time automated fracture mapping program can be statistically consistent with those obtained by a post data automated fracture mapping program operating on the same data. Such features may allow field engineers, operators and analysts, to dynamically visualize and monitor spatial and temporal evolution of hydraulic fractures, to analyze the fracture complexity and reservoir geometry, to evaluate the effectiveness of hydraulic fracturing treatment and to improve the well performance.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The invention claimed is:

1. A computer-implemented method for analyzing microseismic data, the method comprising:
   selecting a subset of microseismic events associated with a fracture treatment of a subterranean zone; and
   determining, by data processing apparatus, confidence in associating the selected subset of microseismic events with a common fracture plane, wherein the confidence is determined based on a moment magnitude for each microseismic event in the subset.

2. The method of claim 1, wherein the confidence is determined based on the number of microseismic events in the subset.

3. The method of claim 1, wherein the confidence is determined based on a location uncertainty for each microseismic event in the subset.

4. The method of claim 1, wherein the confidence is determined by:
   fitting a fracture plane to locations of the microseismic events; and
   calculating the confidence based on the fitted fracture plane.

5. The method of claim 4, wherein the confidence is determined based on an orientation of the fitted fracture plane with respect to a dominant orientation trend defined by a superset of microseismic events associated with the subterranean zone.

6. The method of claim 4, wherein the confidence is determined based on distances between the fitted fracture plane and each microseismic event in the subset.

7. The method of claim 4, wherein the confidence is determined by further:
fitting a plurality of shifted fracture planes based on the locations and based on location uncertainties associated with the microseismic events; and
determining the confidence based on the shifted fracture planes.

8. The method of claim 7, wherein determining the confidence based on the shifted fracture planes comprises calculating a distance between the shifted fracture planes.

9. The method of claim 1, wherein the confidence is determined by calculating a weighted sum based on:
the number of microseismic events in the subset;
a location uncertainty for each microseismic event in the subset;
a moment magnitude for each microseismic event in the subset;
a distance between each microseismic event and a fracture plane fitted to the microseismic events; and
an orientation of the fracture plane fitted to the microseismic events.

10. A non-transitory computer-readable medium encoded with instructions that, when executed by data processing apparatus, perform operations comprising:
selecting a subset of microseismic events associated with a fracture treatment of a subterranean zone; and
determining, by data processing apparatus, confidence in associating the selected subset of microseismic events with a common fracture plane, wherein the confidence is determined based on a moment magnitude for each microseismic event in the subset.

11. The computer-readable medium of claim 10, wherein the confidence is determined based on one or more of:
the number of microseismic events in the subset;
a location uncertainty for each microseismic event in the subset; or
a moment magnitude for each microseismic event in the subset.

12. The computer-readable medium of claim 10, wherein the confidence is determined by:
fitting a fracture plane to locations of the microseismic events; and
calculating the confidence based on the fitted fracture plane.

13. The computer-readable medium of claim 10, wherein the confidence is determined based on an orientation of the fitted fracture plane with respect to a dominant orientation trend defined by a superset of microseismic events associated with the subterranean zone.

14. The computer-readable medium of claim 13, wherein the confidence is determined based on distances between the fitted fracture plane and each microseismic event in the subset.

15. The computer-readable medium of claim 13, wherein the confidence is determined by further:
fitting a plurality of shifted fracture planes based on locations and based on location uncertainties associated with the microseismic events; and
calculating the confidence based on a distance between the shifted fracture planes.

16. A system comprising:
a computer-readable medium that stores microseismic event data associated with a fracture treatment of a subterranean zone; and
data processing apparatus operable to:
select a subset of the microseismic events; and
determine confidence in associating the selected subset of microseismic events with a common fracture plane, wherein the confidence is determined based on a moment magnitude for each microseismic event in the subset.

17. The system of claim 16, further comprising a display device operable to display a graphical representation of the fracture plane and the subset of microseismic events.

18. The system of claim 16, wherein the confidence is determined based on one or more of:
the number of microseismic events in the subset;
a location uncertainty for each microseismic event in the subset; or
a moment magnitude for each microseismic event in the subset.

19. The system of claim 16, wherein the confidence is determined by:
fitting a fracture plane to locations of the microseismic events; and
calculating the confidence based on the fitted fracture plane.

* * * * *